(No Model.)
J. CONWAY.
BREAD SPONGE RAISING DEVICE.
No. 369,776. Patented Sept. 13, 1887.
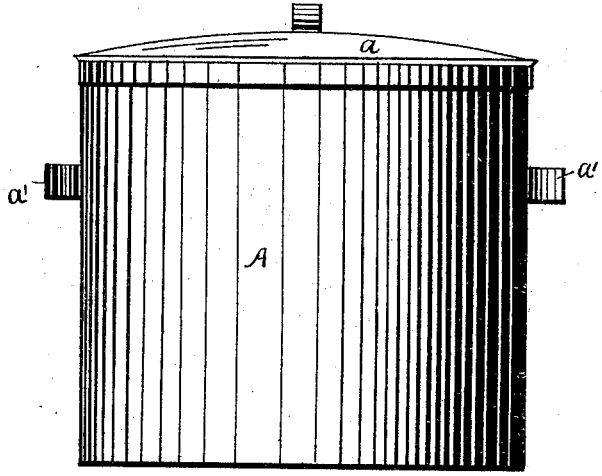
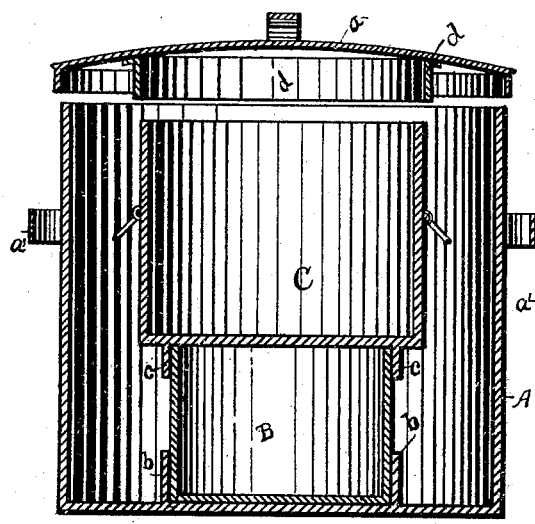
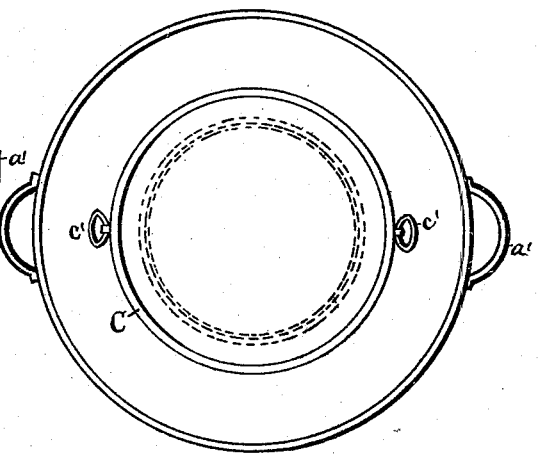
Witnesses
C. B. Currier
Frances H. Shepherd
Inventor
John Conway
By His Attorney
C. C. Shepherd

United States Patent Office.

JOHN CONWAY, OF LONDON, OHIO.

BREAD-SPONGE-RAISING DEVICE.

SPECIFICATION forming part of Letters Patent No. 369,776, dated September 13, 1887.

Application filed March 10, 1887. Serial No. 230,355. (No model.)

*To all whom it may concern:*

Be it known that I, JOHN CONWAY, a citizen of the United States, residing at London, in the county of Madison and State of Ohio, have invented a certain new and useful Improvement in Bread-Sponge-Raising Devices, of which the following is a specification.

My invention is an improvement of devices for heating and raising bread-sponge; and the objects of my invention are to provide a simple, inexpensive, and effective sponge-heating device, having its parts so inclosed and arranged as to retain heat therein a sufficient length of time to cause the sponge to rise. I attain these objects in the manner illustrated in the accompanying drawings, in which—

Figure 1 is an elevation of my device when closed. Fig. 2 is a sectional view showing the lid slightly raised, and Fig. 3 is a plan view with the lid removed.

Similar letters refer to similar parts throughout the several views.

A represents the outer cylindrical case, having a closely-fitting flanged cover, $a$, and suitable handle, $a'$. This case A may be formed of any metallic material, but is preferably formed of tin.

Made to project upwardly from the upper surface of the bottom of the case A, and at equal distances from the inner side thereof, is a circular flange, $b$, adapted to form a seat for a metallic cup or ordinary tin bucket, B, the lower portion of the latter being made to fit therein. Made to rest on the upper and open end of the bucket B is a cylindrical bread-sponge pan C, somewhat larger in circumference than the bucket and provided with suitable handles, $c'$. Made to extend downwardly from the bottom of the pan C, and near the outer edge thereof, is a circular flange, $c$, within which is adapted to be made to fit the upper and open end of the bucket B.

The under side of the lid $a$ of the case A is provided with a downwardly-projecting circular flange, $d$, of such circumference as to be made to fit closely around the upper portion of the pan when the lid $a$ is in its place on the case A.

The bucket B, being first filled or partially filled with hot water, is seated within the flange $b$. The pan C, containing the sponge which it is desired to raise, is then seated on the upper end of the bucket in the manner described. The cover $a$ may then be placed in position, as shown in Fig. 1 of the drawings. It will readily be seen that, the flanges $c$ and $d$ being made to fit, respectively, about the upper portions of the bucket B and pan C, a close connection of the parts is attained, and that said close connections will operate to prevent the escape of the heat arising from the hot or warm water contained in the bucket, while the outer case, A, being free from contact with the bucket and pan, will prevent the direct contact of the cold air therewith.

I have found that by the above-described construction heat may be retained within the device a sufficient length of time to cause the bread-sponge to rise to the desired point.

Having now fully described my invention, what I claim, and desire to secure by Letters Patent, is—

In a bread-sponge-raising device, the combination, with the outer case, A, having the flange $b$, of the internal bucket, B, and pan C, the latter having flange $c$, and lid $a$, having flange $d$, said bucket and pan being free from contact with the case A, substantially as and for the purpose specified.

JOHN CONWAY.

Witnesses:
 MARTIN O'DONNELL,
 WILLIAM CURTAIN.